United States Patent [19]

Knagenhjelm

[11] Patent Number: 4,908,491

[45] Date of Patent: Mar. 13, 1990

[54] INTEGRATED MODULAR TOOL SYSTEM FOR END PREPARATION AND END-TO-END WELDING OF PIPES

[75] Inventor: Hans O. Knagenhjelm, Porsgrunn, Norway

[73] Assignee: Norsk Hydro A.S., Oslo, Norway

[21] Appl. No.: 223,784

[22] PCT Filed: Jan. 27, 1988

[86] PCT No.: PCT/NO88/00008

§ 371 Date: Jul. 19, 1988

§ 102(e) Date: Jul. 19, 1988

[87] PCT Pub. No.: WO88/05707

PCT Pub. Date: Aug. 11, 1988

[30] Foreign Application Priority Data

Jan. 29, 1987 [NO] Norway .................... 870362

[51] Int. Cl.⁴ .................... B23K 9/12
[52] U.S. Cl. .................... 219/61; 219/60 R; 219/125.11; 228/173.1
[58] Field of Search .................... 219/125.11, 60 R, 61, 219/124.34; 228/164, 173 R

[56] References Cited

U.S. PATENT DOCUMENTS 3,753,525 8/1973 Homes .
4,091,514 5/1978 Motes-Conners et al. .
4,331,278 5/1982 Sherer et al. .
4,373,125 2/1983 Kazlauskas .
4,716,271 12/1987 Hulsizer et al. ................ 219/125.11

FOREIGN PATENT DOCUMENTS 2213713 10/1973 Fed. Rep. of Germany .
2808337 9/1979 Fed. Rep. of Germany .
3105312 1/1985 Fed. Rep. of Germany .
3133244 4/1986 Fed. Rep. of Germany .
441505 10/1985 Sweden .
2074068 10/1981 United Kingdom .

OTHER PUBLICATIONS

Derwent's abstract No. J9233 B/42, SU 642,559.

Primary Examiner—Clifford C. Shaw
Attorney, Agent, or Firm—Wenderoth, Lind & Ponack

[57] ABSTRACT

An apparatus method for pipe end preparation and end to end welding of pipes comprises a stationary annular clamp (4) for both clamping and round up of pipes (2). It also has one or two rotating tool carrier rings (5) mounted at one or both sides of the clamp (4) on a track (6). The rotating ring may have thereon devices for cutting, machining of grooves, welding and non-destructive testing (NDT). The round up of the pipe is performed via 6 or more clamping shoes independently operated by screw jacks (18), a wedge mechanism (15) or directly acting hydraulic cylinders.

19 Claims, 7 Drawing Sheets

INTEGRATED MODULAR TOOL SYSTEM FOR END PREPARATION AND END-TO-END WELDING OF PIPES

BACKGROUND OF THE INVENTION

The invention concerns an integrated modular tool for pipe end preparation and end-to-end welding of pipes. The tool can be used under all conditions where fast repair or joining of pipelines is needed. Especially when working under hyperbaric conditions on the seabed, it is essential that the repair can be done in a fast and secure way.

To achieve acceptable mechanized welds it is essential to have the pipe ends prepared and aligned within defined tolerances. When two pipe ends are to be butt welded, the confronting ends of the members will be cut, and normally also beveled, before welding. This involves separate machinery.

In welding of large diameter pipe sections to one another, it is extremely difficult to position and maintain the pipe sections in a proper end-to-end position so that they may properly be welded to one another.

In such operations it is conventional to encircle one section with a clamp with a plurality of jacks which extend beyond the free end of one pipe section and span the joint between the two pipe sections that are to be welded together. The jacks include jack screws which are adjustable radially of the clamp so as to move into engagement with the second pipe section and support one end of the latter in confronting relation with the free end of the pipe section on which the clamp is mounted. The jack screws may be adjusted to align the second pipe section with the first pipe section and, in most cases, the jack screws may be adjusted so as to reform or reshape the configuration of the second pipe to match that of the first pipe.

From GB 2,074,068 there is known an apparatus and method for use in fitting, prior to welding, two pipe sections in end-to-end or telescoping relation. The apparatus includes a fixed support for one of the members to be welded and an annular clamp that is adapted to encircle and clamp the member adjacent its end to which the second member is to be welded. The apparatus also includes a second annular clamp member adapted to encircle the second member that is to be welded to the first member. The two clamp members are spaced apart a distance sufficient to enable the confronting ends of the members to be welded to lie in an exposed position between the two clamp members. Each of the clamp units is provided with a plurality of pressure devices for exerting force on the pipe so as to reform or reshape the pipe ends. The pressure devices have to be operated manually.

The welding is normally done by a welding machine on a separate track. An apparatus of this type is, as an example, described in GB 1,534,773. The apparatus comprises a track capable of being secured to and encircling one of the pipes to be welded at a predetermined distance from an end of the pipe. A movable member is capable of being rapidly coupled to and uncoupled from the track. This member carries an arc welding head and is capable of movement along the track by means of a drivable pinion, which is made to engage teeth on the track.

After welding, control of the weld is required. This involves another operation with testing apparatus on a separate track.

The process of preparing two pipe ends to be welded, the welding, and finally inspection, involves many different operations, and most of the operations also include manual work. Due to the many operation steps and the use of different tools, the whole process will, in addition, be time-consuming. Especially when working under hyperbaric conditions in a habitat with a maximum working depth of 400 msw, it is essential that physical work is avoided and that the work can be finished within a short time.

The main object of the invention is therefore to obtain a tool for faster and easier repair of pipelines.

Another object of the invention is to use the same basic tool for all operations involved, such as round up (reforming a pipe end in a substantially circular configuration), cutting, preparing the pipe end grooves, welding and finally non-destructive testing (NDT).

SUMMARY OF THE INVENTION

The integrated modular tool system (IMT) according to the present invention is basically composed of two split rings, one stationary clamp and one rotating flange (tool-carrier) mounted on the clamp face on a track. Alternatively, the clamp can have two rotating rings, one on each side of the clamp. A tool with two rotating rings is preferably used in welding pipelines under hyperbaric conditions in a habitat with the use of a pup piece (an intermediate pipe piece). It is essential that the clamp can be used as a round up tool, and is rigid enough to hold the roundness of the pipe after it is formed. The round up function is carried out via six or more independent shoes operated by a screw jack, screw operated wedges or direct acting hydraulic cylinders. The same basic tool can be used for all operations involved, such as cutting, preparing the pipe end grooves, welding and finally non-destructive testing (NDT), by fixing the different tools to the tool carrier ring.

BRIEF DESCRIPTION OF THE DRAWINGS

Further features characterizing the invention are described below and shown in the accompanying drawings wherein.

DESCRIPTION OF THE PREFERRED EMBODIMENT

Figure 1:
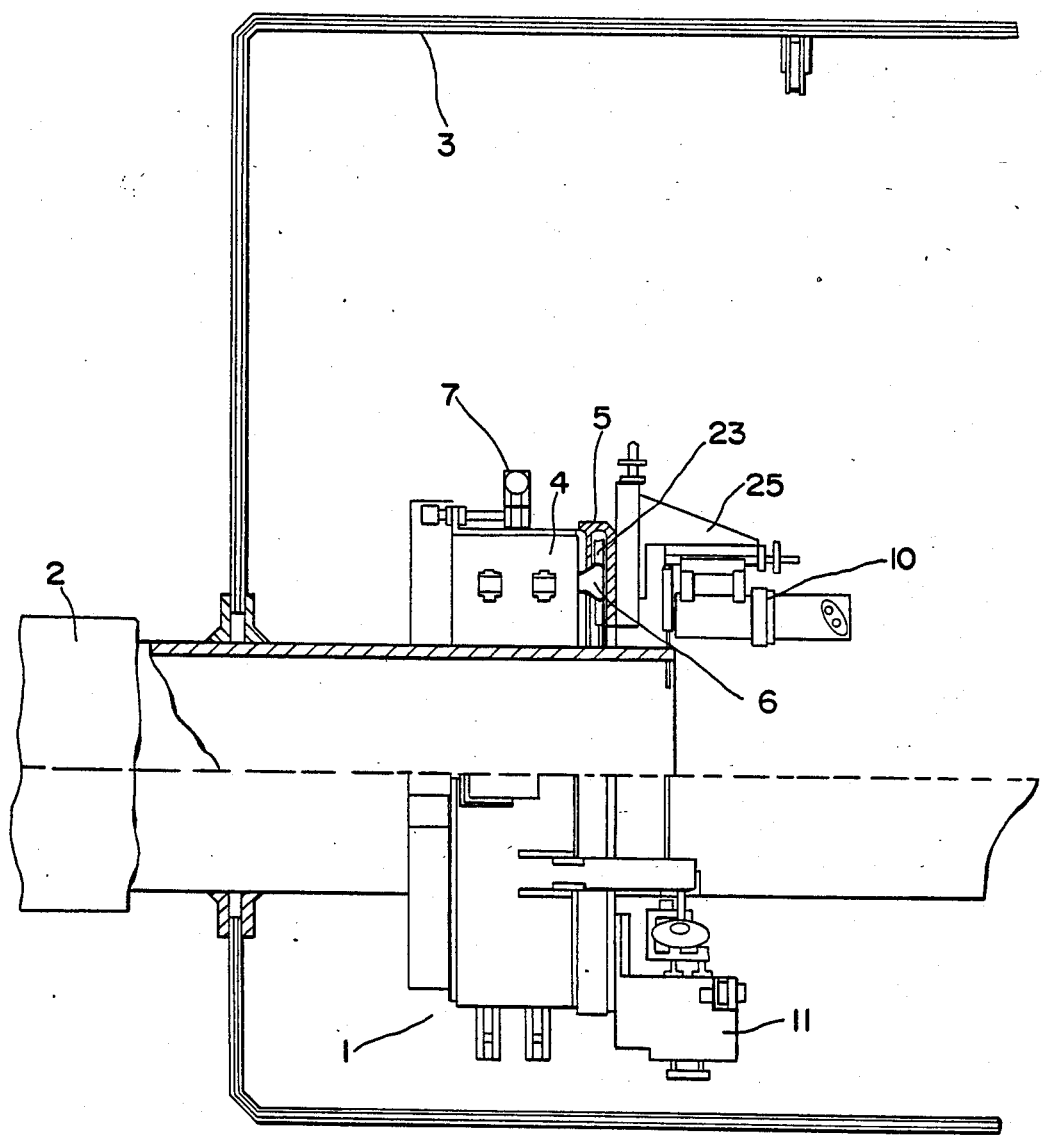
FIG. 1 is a side view of an integrated modular tool system according to the present invention with one part cut away and shown in section.

FIG. 1 shows the integrated modular tool system 1 with one rotating ring closed around a pipeline 2 in a welding habitat 3. The integrated modular tool system is basically composed of two split rings, one stationary (central clamp) 4 and one rotating ring (tool carrier) 5 mounted outside the clamp on a track 6.

The central clamp 1 as shown in FIGS. 1-4 is a ring with a square-box profile split along the vertical centerline. On their top the two halves or splits are connected with a hinge 7. The clamp can be positioned around an existing pipe 2 by opening the hinge 7. A lifting frame and a hoist are used to position the clamp on the pipe. The opening and closing motion of the hinge 7 are controlled by an oilhydraulic operated cylinder 8. To ensure that the clamp acts like a ring, the splits are locked with wedges when installed on the pipeline. Two oil-hydraulic cylinders on top and two at the bottom control the split lock wedges. It is important to have the support clamp as perpendicular to the pipeline as possible. With the closed central clamp around the pipeline, the clamp is lowered until upper clamping shoes 9 (FIG. 2) touch the pipeline surface. A square is used for checking the position at four points. The square measures the angle between the tool-carrier ring 5 and the pipeline surface 2. The maximum allowable difference is 1 mm. In FIG. 1 a machining/sawing tool 10 and a welding/NDT-tool 11 are shown fixed to the tool-carrier ring 5.

On one side of the clamp is a rail ring 6 with a hexagonal profile, serving as a track for the tool carrier ring 5. An oilhydraulic operated worm gear motor is installed on the top of the clamp. The system may also carry a rail ring on the other side of the clamp, thus having one clamp with two rotating rings.

The central clamp 4 can be used as a round up tool, and must have sufficient strength to keep the achieved roundness and an exact position during preparation and welding of the pipe ends. In order to round up the pipe and keep the clamp in the correct position on the pipe, eight inside clamp shoes 9 (FIG. 2) are activated and controlled by a chain system 12 and two oilhydraulic operated motors 13 (FIG. 3).

Figure 2:
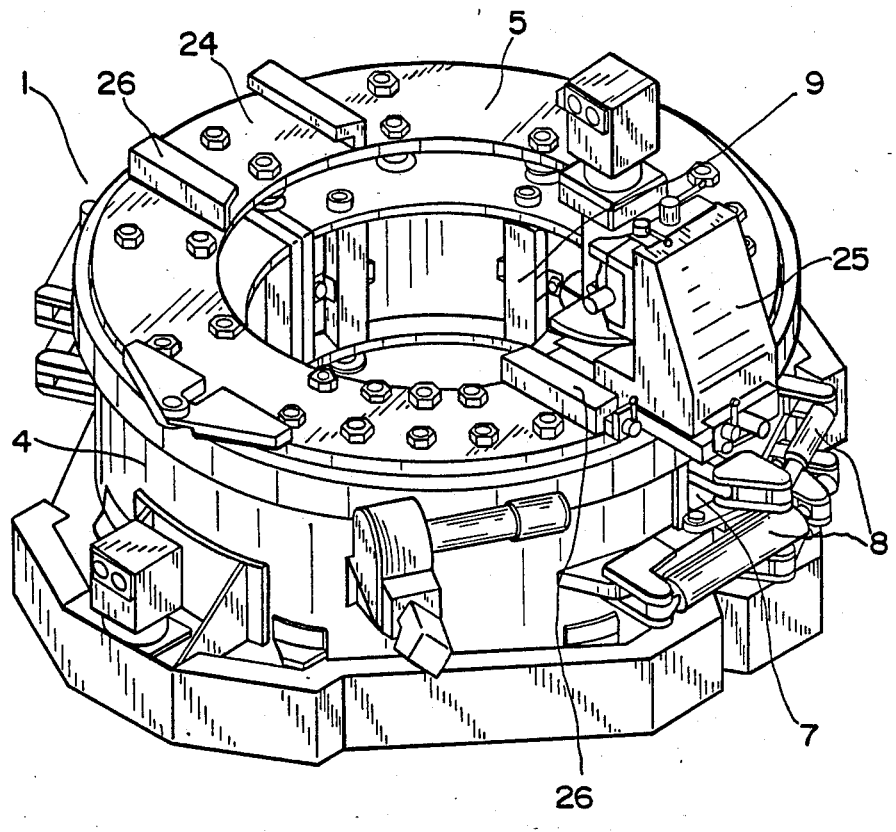
FIG. 2 is a perspective view of the integrated modular tool system with one tool carrier ring.

FIG. 2 is a perspective view of the integrated modular tool system and shows the clamp shoes 9 inside the ring. The chain system 12 and clamp shoes 9 are shown in more detail in FIGS. 3 and 4. The roller chain 12 and chain wheels 14 transform the force from the motors to the shoes 9 simultaneously and make them move in the radial direction towards the pipe.

Figure 3:
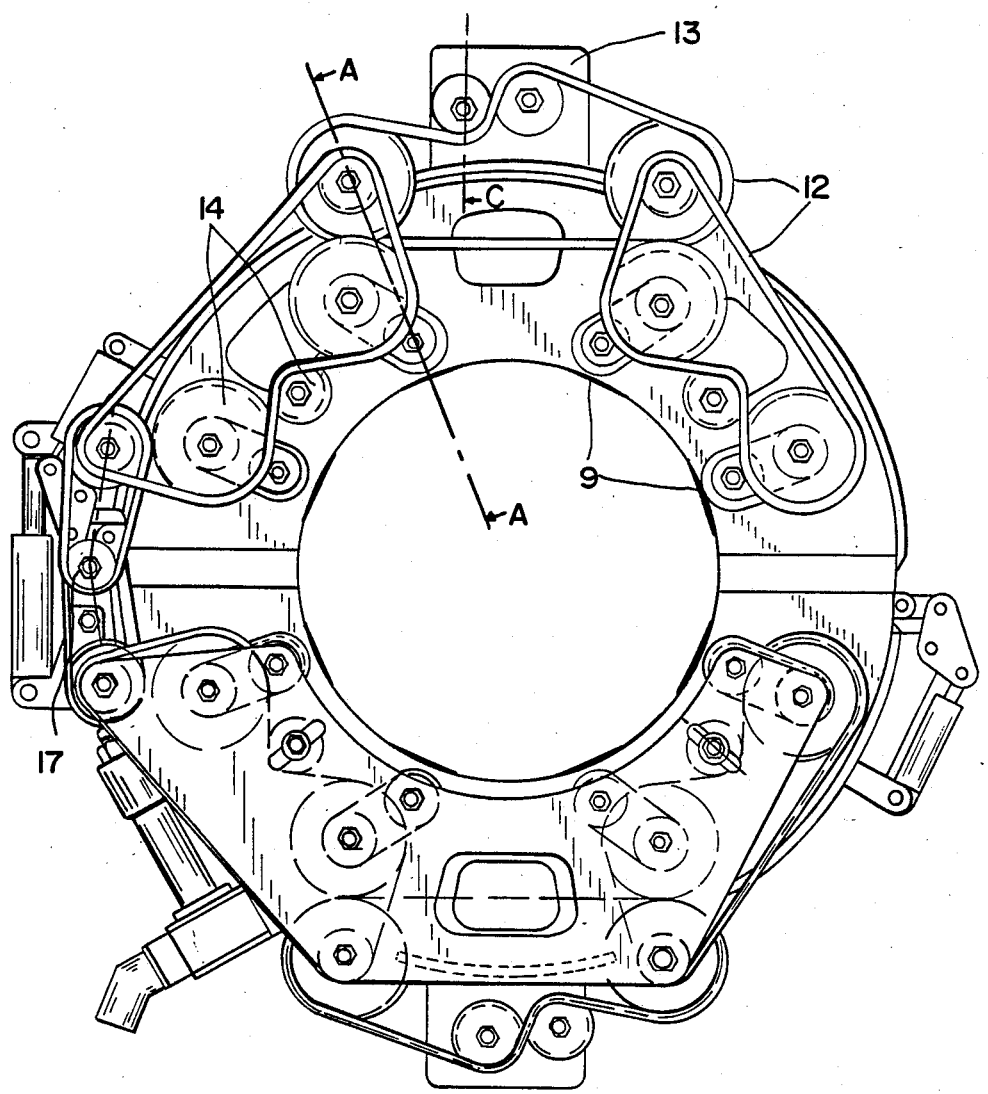
FIG. 3 shows a roller-chain system used with the integrated modular tool system.
Figure 4:
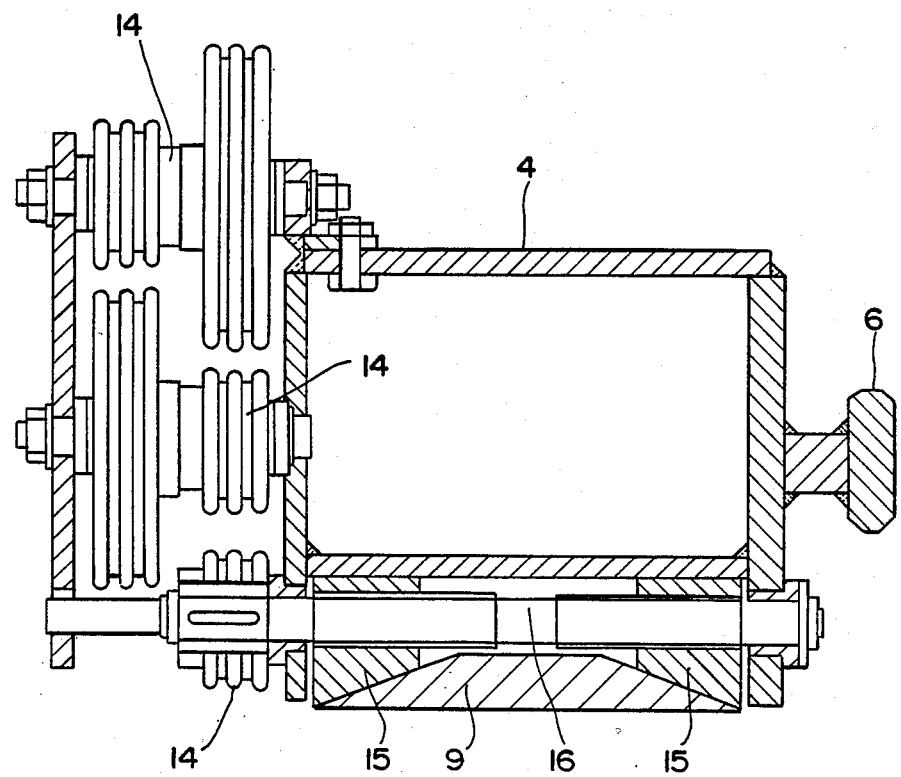
FIG. 4 is a transverse section along line A—A of FIG. 3.

FIG. 4 is a transverse section along line A—A of FIG. 3 and shows the mechanism in detail. Each clamp shoe 9 is moved by a wedge-mechanism 15 that is driven by a left- or righthand threaded spindle 16. The method of driving the spindle to operate the shoes is by the chain system shown in FIG. 3. A chain wheel 17 at the hinge position ties the two drive systems together, ensuring that all spindles 16 receive the same amount of rotation. Non-return valves are used on the drive motors to ensure that the shoes stay locked on the pipe in the event of a drop in hydraulic oil pressure.

Figure 5:
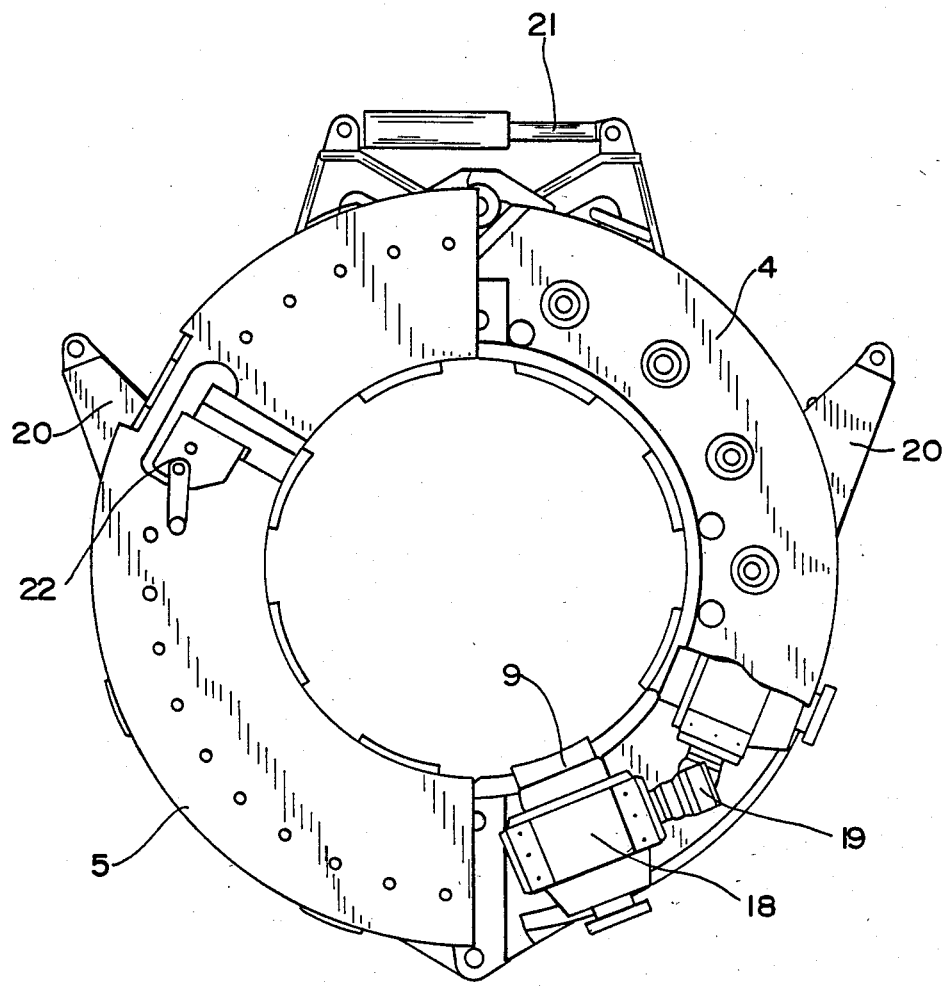
FIG. 5 shows a front view, with and without a faceplate, of an integrated modular tool system according to the present invention, with two rotating rings and with screw jacks.
Figure 6:
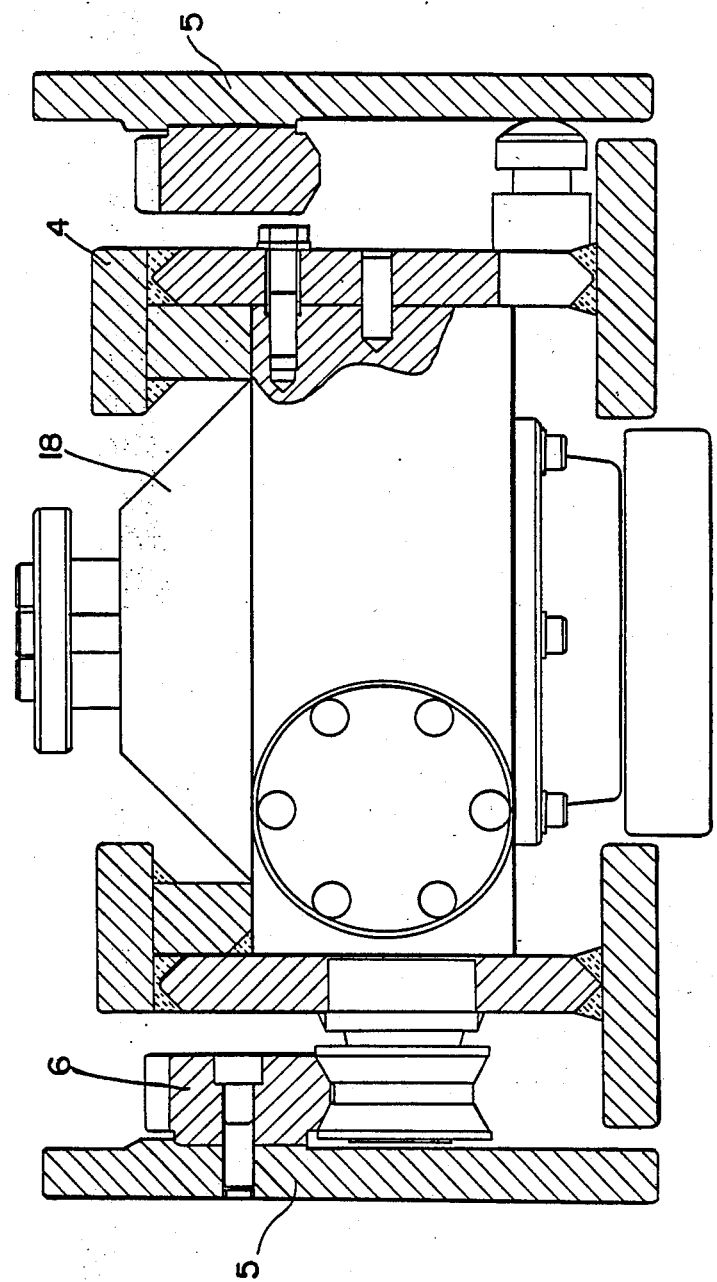
FIG. 6 shows a cross section of the integrated modular tool system according to FIG. 5.

Alternatively, the round up of the pipe can be done by the use of screw jacks. This system is especially preferred when a clamp with two tool carrier rings is used. This is shown in FIGS. 5 and 6. FIG. 5 shows a view with and without the faceplate 5. Screw jacks 18, of a conventional type, with hydraulic motors 19, are used. Eight screw jacks 18 with clamping shoes 9 are arranged around the clamp. The tool is also equipped with two brackets 20 for lifting the tool, and reference number 21 shows a split hydraulic cylinder. Reference number 22 refers to a locking hook system.

By this design, the central clamp 4 no longer has a square-box profile, but has plates screwed to the two sides of the screw jack, forming the clamp 4. This is best shown in FIG. 6.

A software system controls opening of servovalves for the hydraulic motors on each jack. The movement is controlled in a closed loop based on feedback from transducers compared with the demanded movement relative to a reference point for each jack. This reference point is programmable in a menu.

The round up of the pipe is based on equal movement of all jacks from a precalibrated perfect circle. The jacks are controlled using the feed back from the transducers and are moved until a preset maximum round up force. The maximum force is restricted by the feedback of supply pressure to the jack motors. This pressure is limited by a programmable pressure unit in the jack menu, thus limiting the maximum force exerted. After initial round up, a measurement of "out of center" and "out of roundness" is performed. If this measurement is not within a desirable range, individual movement of jacks can be done manually, or automatically according to an algorithm. All measurement censors are fixed to the rotating tool carrier ring. All measurements are recorded by an inclinometer for positioning the pipe ends and further reference to welding parameters.

This method is also used in rounding up with the roller chain system. The round up function can also be carried out using directly acting hydraulic cylinders.

Figure 7:
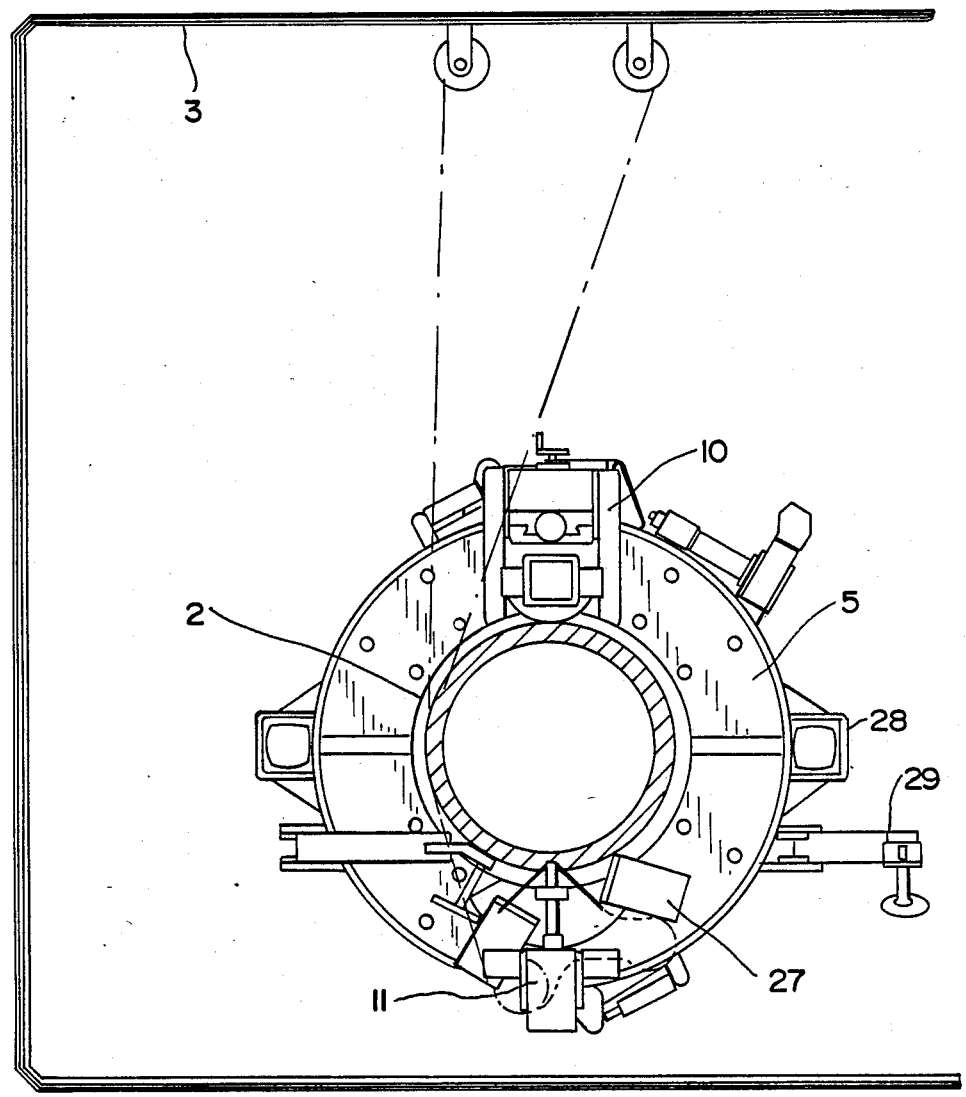
FIG. 7 shows a face plate of a tool carrier ring having different tools fixed thereto.

The tool carrier ring 5 is shown both in FIGS. 1, 2 and 7. The tool carrier is a split ring with an L-profile. The face plate of the tool carrier ring can be continuous as shown in the figures, or partly continuous (i.e. the ring may be a circular disc or just a portion or sector of a circular disc). The two halves are kept together with a hinge. The tool carrier is equipped with thirty grooved wheels 23 that retain it on the clamp rail 6, ensuring smooth movement and non-separation from the clamp. The circumference of the tool-carrier is gear toothed to accept a gear drive from the motor mounted on the clamp. When operating the motor, the tool-carrier revolves around the pipeline. The tool-carrier has three stations 24 (FIG. 2) for installing different tools.

The rotating tool carrier ring carries interchangeable hydraulic and/or electric step motor driven tools as follows:

1. Cut off and bevel module.
2. Counter-bore module.
3. Milling module for removing defects or surface machining.
4. Remote operated welding head including weld pool observation system.
5. Remotely operated NDT head.
6. Metrology system.

A tool retainer 25 is installed by skids and wedges into clamping shoes 26 (FIG. 2) at one of the selected stations on the tool carrier. A tool connection plate on the tool retainer 25 can be moved in two directions, along the pipe and radial to the pipe. The motions are controlled by manually rotated spindles.

One saw 10 is installed on the tool connection plate by skids and wedges. The saw is shown in FIG. 7. An oilhydraulic operated motor is directly coupled to the saw blade and gives a controlled speed of approximately 40 rpm. The saw operation is manually carried out by forcing the rotating saw blade radially through the pipe wall. Then the worm gear motor is activated and the saw travels around the pipe cutting off the pipe. The cut-off piece is, when small, lifted away manually, but otherwise, hooked on a crane and gently removed. After completion of the cut, the saw is removed.

The welding of the pipeline requires two different milling operations, one from the outside to make an L-shaped groove radially on the pipe end and another from the inside (counter bore) to make a smooth surface and an accurate height of a groove land. The mill is installed in the same manner as discussed above, and is able to perform these operations. The mill is controlled by an oilhydraulic operated motor.

The outside and inside milling operation is carried out by manual adjustment of the tool connection plate until correct machinery settings are achieved according to a selected groove configuration. The worm gear motor is activated and moves the mill around the pipe.

Both the sawing and milling operations are supplied with cooling and lubricating fluid. The cooling and lubricating function is particularly important during sawing.

All different IMT-operations are controlled from an oil-hydraulic operation panel. The panel has one directional valve for each operation. The system also includes one-way valves, pressure valves, pressure gauges etc.

Due to the system design, the directional valve on the split locking has no effect before the clamp split is closed and the valve is in a closed position. Then the locking wedges can be activated.

To keep all cylinders in a fixed position, they are equipped with pressure controlled one-way valves.

The worm gear motor can be controlled manually from the operation panel or automatically from the computer (only when welding). During automatic control, all other functions are dead. The motor is protected by a pressure valve in case of an accident in the tool-carrier motion. The clamping function is controlled by an adjustable pressure valve on the locking.

A safety system consists of two hydraulic operated valves placed on each side of the pipe close to the work site. When these valves are activated, the complete hydraulic system is dead and all motions will stop immediately. If activated, the safety system overrides the automatic surface control.

The welding/non-destructive testing system 11 is shown in both FIGS. 1 and 7. There is used a shielding gas flow system and an observation system based on two video cameras 27 for double side viewing of the weld pool. The welding process can be remotely controlled from the sea surface. The welds are examined from both sides simultaneously. In FIG. 7, number 28 refers to brackets for the motor and number 29 refers to support brackets for a pup-piece.

To obtain a round pipe, and to get information for establishing correct welding parameters, several measurements must be carried out. A linear voltage transducer (LVDT) is used and the following measurements are carried out:
1. Measurement of out of center and out of roundness.
2. Measurement of internal diameter prior to counter bore.
3. Measurement of internal diameter after counter bore.
4. Measurement of land thickness after groove machining.
5. Measurement of high/low after alingment/pup piece installation.
6. Measurement of high/low for weld II after release of round up forces.

All measurements are recorded by an inclinometer for positioning and for further reference to welding parameters.

Measurement 2 is used to determine the maximum allowable counterbore and to determine the desired internal diameter to fit the internal diameter of a pup piece or the internal diameter of an opposite pipe end. Measurement 3 is a check of measurement 2.

Measurements 4–6 are used to compose a menu of welding parameters based on data and tolerance boxes as function of "idealized" fit up's.

When the repair of pipelines is carried out under hyperbaric conditions in a habitat, a pup-piece is sometimes used to fit between the two pipe ends. The following installation procedure is followed using the integrated modular tool system with two tool carrier rings:

A crane is used for positioning the clamp to the pipe. The clamp with the tool carrier rings thereon is first positioned on a first pipe end, centered, measured and locked into fixed and final position. Screw jacks or roller chains etc. are activated and the pipe is rounded up. Then the cut-off/bevel module is installed on the tool-carrier ring on the first pipe end. Cut-off and end preparation are performed and the cut-off ring is removed from the first pipe end via a support clamp. A counter-bore module is installed on the tool carrier ring after removing the bevel module.

The clamp is then moved and positioned at the second pipe end. The gap between the two pipe ends is measured. The same procedure with round up, cut, bevel, counter-bore and internal diameter measurement as performed with the first pipe end is followed at the second pipe end. Then the pup piece is installed by a handling system. Pulling equipment and height extended centering clamps and extended support clamps are used to align and lock the pup piece to the two pipe ends. Welding is then performed between the pipe end and the pup piece and followed by NDT-test. The clamp is then moved back to the first pipe end. The welding equipment is fixed to the other tool carrier ring. The first pipe end is then again rounded up or adjusted to the pup ovality if necessary, and welding and NDT-testing is performed. Then all equipment is removed.

By welding in a habitat using a pup piece, it is especially advantageous to use a clamp with two rotating rings. This makes it possible just to move the clamp between the two pipe ends without having to open the clamp, take it off, turn it around, and finally relock the clamp to get the tool carrier ring in the right position. For welding without a pup piece, only one tool carrier ring is necessary.

By this system there is obtained a fast and easy repair of pipelines. The use of the equipment is not limited to use under seabed hyperbaric conditions. It can also be used whereever a fast, easy and almost automatic process for preparing and welding of pipe ends is wanted. A special advantage with this system is that it has only one reference for the whole pipe end preparing and welding process.

I claim:

1. An integrated modular tool system for end preparation and end to end welding of pipes, comprising:
    an annular clamp for clamping attachment to the end of a pipe, said clamp having opposite lateral sides, means for rounding the end of a pipe, and a track fixed to one of said lateral sides; and a tool carrier ring plate having thereon means rotatably mounting said tool carrier ring plate on said track of said annular clamp such that said tool carrier ring plate is rotatable relative to said annular clamp, said tool carrier ring plate further including a tool carrying surface extending in a plane perpendicular to the central axis of the tool carrier ring plate and having means thereon for mounting at least one tool for application to the end of a pipe.

2. The integrated modular tool system as set forth in claim 1, wherein:
said means of rotatably mounting said tool carrier ring plate on said track comprises a plurality of grooved wheels for rotational engagement with said track.

3. The integrated modular tool system as set forth in claim 1, wherein:
said annular clamp has mounted thereon a motor with a gear drive; and
said tool carrier ring plate has a plurality of gear teeth thereon for drivable engagement with said gear drive of said motor on said annular clamp.

4. The integrated modular tool system as set forth in claim 1, wherein:
said tool carrier ring plate is in the shape of at least a partial circular disc.

5. The integrated modular tool system as set forth in claim 4, wherein:
said tool carrier ring plate is in the shape of a continuous circular disc.

6. The integrated modular tool system as set forth in claim 1, wherein:
said means for mounting said at least one tool on said tool carrier ring plate is a means for mounting a plurality of tools on said tool carrier ring plate.

7. The integrated modular tool system as set forth in claim 1, wherein said means for rounding a pipe end comprises:
a plurality of clamping shoes disposed about the inner circumference of said annular clamp; and
means for independently radially moving each said clamping shoe, whereby a pipe end can be rounded by radially moving said clamping shoes into contact with the pipe end.

8. The integrated modular tool system as set forth in claim 7, wherein:
said plurality of clamping shoes comprises at least six said clamping shoes.

9. The integrated modular tool system as set forth in claim 7, wherein:
said means for moving said clamping shoes comprises a wedge mechanism for each said clamping shoe, each said wedge mechanism comprising at least one wedge for radially moving the respective clamping shoe and a threaded spindle engaged with said wedge for moving said wedge.

10. The integrated modular tool system as set forth in claim 9, wherein:
said means for moving said clamping shoes further comprises a chain system for rotatably driving each said respective threaded spindle to radially move said wedges and at least one motor for driving said chain system.

11. The integrated modular tool system as set forth in claim 7, wherein:
said means for moving said clamping shoes comprises a screw jack for each respective said clamping shoe.

12. The integrated modular tool system as set forth in claim 7, wherein:
said means for moving said clamping shoes comprises a directly acting hydraulic cylinder for each respective said clamping shoe.

13. An integrated modular tool system for end preparation and end to end welding of pipes in a subsea habitat, comprising:
an annular clamp for clamping attachment to the end of a pipe, said annular clamp having opposite lateral sides;
a means disposed on said annular clamp for rounding a pipe end, said means for rounding comprising a plurality of radially movable clamping shoes and a plurality of screw jacks for moving respective said clamping shoes;
a first tool carrier ring plate rotatable mounted to one of said lateral sides of said annular clamp; and
a second tool carrier ring plate rotatably mounted to the other said lateral side of said annular clamp;
each said tool carrier ring plate having thereon means for mounting a plurality of tools.

14. The integrated modular tool system as set forth in claim 13, wherein:
each said screw jack has a position sensor mounted thereon for detecting the extent of movement of the screw jack.

15. A method of end preparation and end to end welding of pipes, comprising:
providing an annular clamp having opposite lateral sides, means for rounding a pipe end, a track fixed to one of said lateral sides, and a tool carrier ring plate rotatably mounted on said track, said tool carrier ring plate comprising a tool carrying surface extending in a plane perpendicular to the central axis of the tool carrier ring plate and having means thereon for mounting a plurality of tools;
applying said annular clamp to the pipe end;
clamping and rounding the pipe end with said means for rounding the pipe end;
mounting a plurality of tools on said tool carrier ring plate;
rotating said tool carrier ring plate on said track; and
cutting, machining grooves, welding and performing non-destructive testing on the pipe end with said plurality of tools on said tool carrier ring plate while rotating said tool carrier ring plate on said track.

16. The method as set forth in claim 15, wherein:
said step of providing said means for rounding comprises providing a means for rounding a pipe end having at least six clamping shoes and a plurality of automatically operable wedge mechanisms for operating respective said clamping shoes.

17. The method as set forth in claim 16, and further comprising:
providing a microprocessor for controlling said step of rounding the pipe end; and
controlling said step of rounding with said microprocessor by precalibrating the circularity of the pipe end and controlling movement of said clamping shoes so as to move said clamping shoes equally.

18. The method as set forth in claim 16, and further comprising:
providing a microprocessor for controlling said step of rounding the pipe end; and controlling said step of rounding with said microprocessor by providing a sensor on said tool carrier ring plate, sensing the inside of the pipe with said sensor, and feeding back information from said sensor to said microprocessor to control movement of said clamping shoes.

19. The method as set forth in claim 15, and further comprising:
    providing an inclinometer control means for controlling said steps of rotating said tool carrier ring plate and welding the pipe end.

* * * * *